No. 802,356. PATENTED OCT. 17, 1905.
F. A. LAW.
STEERING GEAR.
APPLICATION FILED JULY 19, 1904.
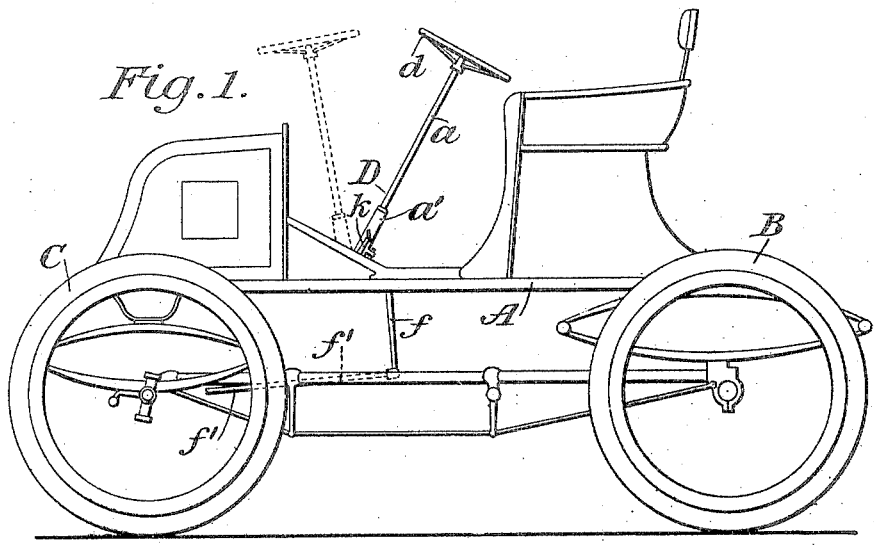
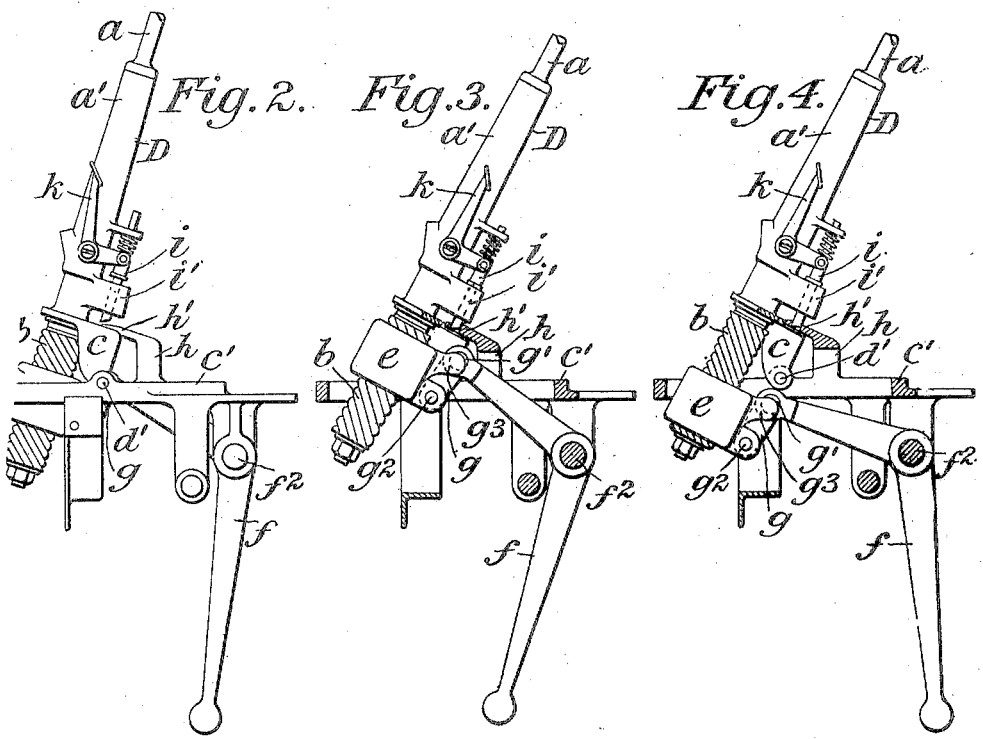

UNITED STATES PATENT OFFICE.

FRED A. LAW, OF HARTFORD, CONNECTICUT, ASSIGNOR TO ELECTRIC VEHICLE COMPANY, OF JERSEY CITY, NEW JERSEY, AND HARTFORD, CONNECTICUT, A CORPORATION OF NEW JERSEY.

STEERING-GEAR.

No. 802,356.  Specification of Letters Patent.  Patented Oct. 17, 1905.

Original application filed April 3, 1902, Serial No. 101,290. Divided and this application filed July 19, 1904. Serial No. 217,156.

*To all whom it may concern:*

Be it known that I, FRED A. LAW, a citizen of the United States, residing in Hartford, county of Hartford, State of Connecticut, have invented certain new and useful Improvements in Steering-Gear, of which the following is a specification, reference being had to the accompanying drawings, forming a part hereof, this application being a division of application, Serial No. 101,290, filed April 3, 1902.

This invention relates especially to steering mechanism for self-propelled vehicles in which the steering wheel or lever is so mounted and supported that it can be moved forward from its normal position of use directly in front of the operator in order that it shall not obstruct passage to and from the vehicle-seat, although features of construction hereinafter described are also capable of application to a steering mechanism which embodies a fixed steering-pillar.

The invention is particularly concerned with the means for mounting and supporting the steering pillar or shaft and with the connections whereby motion is imparted from the rotary steering-shaft to the linkage by which the wheels of the vehicle are deflected.

One object of the invention is to provide a firm support for the steering pillar or shaft.

Another object is to provide for such construction of the intermediate devices as shall prevent the transmission of shocks from the steering-wheels of the vehicle to the hand wheel or lever.

A further object is to make the connections between the steering-shaft and the steering-linkage of such a character that they shall be strong, reliable, and easily operated in all positions of the steering-pillar.

The invention and its purposes will be more fully explained hereinafter with reference to the accompanying drawings, in which it is illustrated as embodied in a convenient and practical form, and in which—

Figure 1 is a view in side elevation of a vehicle to which the improved steering-gear may be applied, the normal position of the handwheel and its supporting shaft or pillar being shown in full lines, while the forward portion of the same is represented by dotted lines. Fig. 2 is a detail view, in side elevation, on a larger scale than that of Fig. 1, showing the steering-shaft and its pertinent parts in normal position. Figs. 3 and 4 are views generally similar to Fig. 2, but partly in section and showing the traverse-nut near opposite extremes of its movement.

In the vehicle represented in Fig. 1 of the drawings the body A thereof is represented as spring-supported upon the axles which carry the rear driving-wheels B and the front steering-wheels C. The steering shaft or pillar D is also shown in said figure as comprising a hand-wheel $d$, mounted upon a shaft $a$, which is supported for rotation in a bearing-sleeve $a'$ of suitable length and secured at its lower end to a bifurcated bracket $c$. The latter is pivoted to swing in a vertical longitudinal plane, as at $d'$, upon a suitable frame $c'$, which may be a portion of the frame or body of the vehicle, so as to gain the greatest possible amount of strength and stability. The steering-shaft $a$ is extended downward through the sleeve or bearing $a'$ and carries at its lower end a quick pitch-screw $b$, which is shown in this instance as an external screw and is engaged by a correspondingly-threaded element or traverse-block $e$. It will be observed that the threaded element $e$ and the bearing element $a'$ are relatively movable with respect to each other in an axial direction by rotation of the shaft $a$ in one direction or the other and that one of such elements, such as the bearing element $a'$, is held against the axial thrust of the shaft, while the other of said elements, such as the traverse block or nut $e$, is connected, through transmitting devices hereinafter to be described and the usual steering-linkage, to the steering-wheels of the vehicle. In the embodiment of the invention shown in the drawings the traverse block or nut $e$ is held against rotation with the screw $b$ through its connection with one arm of a rocker $f$, which is shown in the drawings as a two-armed lever pivoted upon a short shaft $f^2$, held in suitable bearings on the floor or body of the vehicle, said shaft $f^2$ maintaining a fixed relation to the pivot of the bearing $a'$ for the movable shaft $a$. The other end of the rocker is provided with a knuckle for engagement with the main steering-rod $f'$ of the steering-linkage.

In the construction shown in detail in Figs. 2, 3, and 4 the upper or shorter arm of the rocker or steering arm or lever $f$ is connected to the traverse block or nut $e$ by a link $g$, which is pivoted at $g'$ to the arm of the rocker and at $g^2$ to the traverse-block. The latter is forked, as at $g^3$, to straddle the link $g$ and the end of the rocker-arm, such arrangement constituting means whereby the rotation of the traverse block or nut with the screw is prevented without permitting lost motion, on the one hand, or occasioning excessive binding upon the relatively movable parts, on the other hand. It will also be noted that when the traverse-nut $e$ is in its normal or middle position, as represented in Fig. 2, the axis of the pivots $d'$ of the bracket $c$ and the axis of the pivotal connection between the link $g$ and the arm of the rocker $f$ are coincident, so that when the parts are in this position the steering-pillar can be swung forward or backward, as may be necessary, without straining or cramping any of the coacting parts. It is therefore unnecessary to turn the hand-wheel in order to permit the movement of the steering-pillar out of its normal position. Furthermore, even if the traverse-nut $e$ is not in its middle position nevertheless the steering-pillar may be moved freely either forward or backward without straining or cramping the coacting parts, since the link $g$ will accommodate the movement of the traverse-nut with the steering-pillar upon its supporting-pivots $d'$ regardless of the position of the traverse-nut upon the screw. The axis upon which the steering-pillar swings is therefore so arranged and positioned with relation to the rocker $f$ and the traverse-nut and such connections are themselves so arranged that no movement is transmitted to the rocker by reason of any swinging movement of the steering-pillar upon its pivots however the traverse-nut may be placed upon the screw. It will be noted also that the steering-pillar, or at least the threaded lower portion thereof, has its axis lying in substantially the same plane as that in which the rocker $f$ lies and oscillates upon its transverse supporting-shaft, so that all strains which tend to oscillate such rocker to deflect the steering-wheels are in the same plane. In this manner the liability to cramping of the parts is reduced and perfect operation is insured, while wear is lessened and all unnecessary strains are eliminated. The disposition of the bearings of the oscillating rocker symmetrically on either side of the plane of oscillation is also advantageous, although it is not essential, particularly if the supporting-bearings of the arm are on opposite sides of the plane, as would be the case if the shaft of the rocker were extended to one side of said plane to support a depending arm near one side of the vehicle for connection with the steering-linkage.

For the purpose of locking the steering-pillar in the position to which it may be moved an extension $h$ of the frame $c'$ is provided with a perforated lip $h'$ for engagement with a latch or plunger $i$, carried in suitable bearings $i'$ upon the supporting-sleeve $a'$. A foot-press or angle-lever $k$, adapted to be operated by the foot of the operator, is also mounted upon the sleeve $a'$ and is operatively connected with the latch or plunger $i$. Since the foot-press $k$ is mounted upon the bearing-sleeve $a'$ of the steering-pillar, the pressure of the foot thereon not only releases the latch, so that the steering-pillar may be thrown forward out of its normal position, but it assists in effecting the forward movement of the steering-pillar, thereby relieving the operator's hand and aiding in quickly clearing the space in front of the seat to permit the unhindered exit of the operator.

It will be obvious that various changes may be made in the details of construction and in the relation of parts of the particular mechanism which has been chosen herein as an illustration of the invention without departing from the spirit of the invention and that some features of the improved construction may be used advantageously without other features. It will also be obvious that the improvements may be employed in any kind of steering-gear and are not necessarily limited to steering-gear for motor-vehicles.

I claim as my invention—

1. In combination in a steering mechanism, a body or frame base-plate, a bearing therein for a rotating steering-shaft, a rotating steering-shaft, a screw on the lower end thereof, a second bearing in said base-plate, a transverse shaft therein, a depending oscillating arm supported on said shaft, interconnections between the lower threaded end of the steering-shaft and the oscillating arm including link connections located and moving substantially in the same vertical plane of the steering-shaft, as and for the purpose described.

2. In combination in a steering mechanism, a rotating steering-shaft, a bearing therefor, a quick-pitch screw on the lower end thereof, a traverse member mounted thereon, a bearing in proximity thereto supporting a transverse shaft, a depending oscillating arm supported on said transverse shaft, flexible connections between said traverse member on the lower end of the steering-shaft and the shaft with the depending arm, the center of movement of said connections substantially in a plane including the axis of the steering-shaft, and means for holding said connections and traverse member symmetrically disposed with respect to said plane.

3. In combination in a steering mechanism, a steering-shaft rotatable about its axis, a bearing or pillar pivoted upon the vehicle or frame, an arm operatively connected with the steering mechanism and pivotally mounted upon the vehicle or frame, coöperating members upon the shaft and said arm respectively whereby the rotation of the shaft effects movement of the arm in any position of the pillar about its pivotal or hinged axis, said members between said shaft and said arm arranged with respect to the pivotal axis of said pillar whereby substantially no movement is transmitted to said arm upon the hinging of said pillar.

4. In combination in a steering mechanism, a hinged steering-pillar, including a supporting-bearing and a rotary shaft, a nut adapted to be moved upon the rotation of the shaft, a steering-arm, and link and pivotal connections intermediate of the arm, traverse nut and link, whereby a free swinging movement of the shaft and bearing is permitted at all times, irrespective of the position of the steering-arm.

5. In combination in a steering mechanism, a hinged steering-pillar, comprising a bearing and supporting member, and a rotary steering-shaft, a frame supporting said parts and provided with a latch coöperating with a bolt borne upon the steering-pillar, a traverse-nut, a steering-arm, and connections intermediate of said nut and arm, whereby the position of one of said members may be changed without altering the position of the other.

6. In combination in a steering mechanism, a steering-arm and connections intermediate of the arm and steering-wheels, a hinged steering-pillar, comprising a support and rotary steering-shaft, a traverse-nut borne upon and adapted to be moved upon a movement of the steering-pillar and adapted for movement upon rotation of the steering-shaft and connections intermediate of the traverse-nut and steering-arm, whereby motion is transmitted to said steering-arm, only upon the movements of the traverse-nut incidental to the rotation of the steering-shaft.

7. In combination, in a steering mechanism, a hinged steering-pillar, a steering-shaft movable with said hinged pillar and provided with a screw-thread, a traverse-nut adapted to assume different positions axially of the steering-shaft, a steering-lever and a link connection intermediate of the traverse-nut and the steering-lever, whereby a free swinging movement of the steering-pillar is permitted irrespective of the position of the steering-lever.

8. The combination in a steering mechanism, of a hinged pillar, a steering-shaft movable with said pillar and having a movement relatively thereto, a traverse-nut adapted for movement along the steering-shaft and controlled by the relative movement of the steering pillar and shaft, a steering-arm, and a link connection intermediate of the arm and traverse-nut whereby the movement of the former is unaffected by the movement of the steering-pillar.

9. In combination in a steering mechanism, a pillar comprising a rotating shaft and a support therefor, a threaded lower end portion on said rotating shaft, a traverse-nut surrounding said threaded portion of said shaft, and a pivoted steering-arm having a link connection with said nut, said connections including guideways preventing the rotation of said nut.

10. In a steering-gear for automobiles, a rotating shaft, a base-supporting pillar, a journal therein to support said shaft, a quick-pitch screw on the lower end of said shaft, a traverse-nut on said quick-pitch screw, a two-armed lever journaled on the lower side of said base, one arm of said lever being connected to the traverse-nut by a link, and connections from the steering-wheels to the other arm of said lever as and for the purpose described.

11. In combination in a base or foot for a steering-gear on a vehicle-body, a base-plate, a journal or supporting-pillar, a journal for the two-armed lever, a two-armed lever, a quick-pitch screw below said pillar-journal, a traverse-nut thereon, and means including a link connection to said two-armed lever for preventing the rotation of said traverse-nut.

This specification signed and witnessed this 15th day of July, A. D. 1904.

FRED A. LAW.

In presence of—
L. K. MOSES,
RUDOLPH RIEGE.